United States Patent
Dougherty

[11] Patent Number: 5,960,504
[45] Date of Patent: Oct. 5, 1999

[54] FISHING TACKLE EYEHOLE CLEANING TOOL

[75] Inventor: Richard A. Dougherty, Hershey, Pa.

[73] Assignee: D. C. D. Global, Inc., Hershey, Pa.

[21] Appl. No.: 09/065,187

[22] Filed: Apr. 23, 1998

[51] Int. Cl.[6] ......................................... A47L 25/00
[52] U.S. Cl. ........................... 15/104.001; 43/4; 30/363; 30/28; 7/106
[58] Field of Search ................. 15/104.001, 105; 43/1, 4; 30/28, 142, 145, 120.1, 363; 132/75.5; 7/106, 158, 169

[56] References Cited

U.S. PATENT DOCUMENTS

| | | | |
|---|---|---|---|
| 390,457 | 10/1888 | Cook | 30/363 |
| 961,800 | 6/1910 | Rogers | 30/363 |
| 1,176,793 | 3/1916 | Tuttle | 30/363 |
| 1,464,807 | 8/1923 | Clark | 30/363 |
| 2,961,670 | 11/1960 | Frame | 7/106 |
| 3,353,819 | 11/1967 | Palmer | 30/28 |
| 3,447,173 | 6/1969 | Kleiman | 30/28 |
| 3,754,290 | 8/1973 | Nicholson | 7/106 |
| 3,825,961 | 7/1974 | Klein | 7/106 |
| 4,484,368 | 11/1984 | Thompson | 7/106 |
| 4,799,326 | 1/1989 | Mertens | 43/4 |
| 5,136,744 | 8/1992 | Allsop et al. | 7/106 |
| 5,283,920 | 2/1994 | Plummer | 7/106 |

*Primary Examiner*—Mark Spisich
*Assistant Examiner*—Theresa T. Snider
*Attorney, Agent, or Firm*—Charles M. Kaplan

[57] ABSTRACT

A multi-purpose fisherman's tool and method for removing unwanted material from the eyehole of fishing tackle employs a sharp prong that may be locked in place in a rectangular opening in a flat plate that supports the fishing tackle while it is rotated around the prong.

13 Claims, 4 Drawing Sheets

FISHING TACKLE EYEHOLE CLEANING TOOL

BACKGROUND OF THE INVENTION

This invention relates to fishing tackle, and more particularly to the removal of unwanted material from the eyeholes of fish hooks and fishing lures.

Fish hook and fishing lure eyeholes often become filled with, or partially clogged by, unwanted materials such as rust, dirt, plant matter, ice or old fishing line. Also, some fishing lures, such as lead head jigs, are manufactured by spraying them with, or dipping them into, paint or plastic materials that clog the eyehole of such lures. Prior hand tools used to unclog these eyeholes have not been satisfactory because they do not adequately support the fish hook or lure while the unwanted material is being removed, and they were limited as to the size of the eye hole that they could clean. Some tools even made cleaning difficult because they limited the amount of rotational movement that could take place between the fish hook or lure and the part of the tool that penetrated the eyehole. Also, some prior tools were dangerous because the person using them might be stuck by the point of a hook being cleaned or a hook connected to a lure because of the forces exerted when the eyehole is being rotated or twisted to completely clean it.

OBJECTIVES OF THE INVENTION

Accordingly, it is an object of this invention to provide improved tools and methods for cleaning the eyeholes of fishing tackle.

Another object is to provide fishermen with safer eyehole cleanings tools and methods.

An additional object is to provide a hand tool for fishermen that adequately supports a fish hook or fish lure while it is being cleaned and which permits sufficient rotation to take place between the tool and a tackle to clean the eyehole without requiring the eyehole to be removed from the tool and repositioned.

Another object is to provide a tool that can clean essentially any sized fishing tackle eyehole.

Another object is to provide a multipurpose tool that can be used by fishermen to perform several tasks including cleaning fishing tackle eyeholes.

A further object is to provide a portable, hand operated, multipurpose tool that includes a fishing tackle eyehole cleaning instrument that is rugged, economical, easy and safe to use, maintenance free, pleasing in appearance, and which does not possess defects found in similar prior art fisherman's tools.

Other objects and advantages of the tools and methods incorporating this invention will be found in the specification and claims and the scope of the invention will be set forth in the claims.

DESCRIPTION OF THE INVENTION

Figure 1:
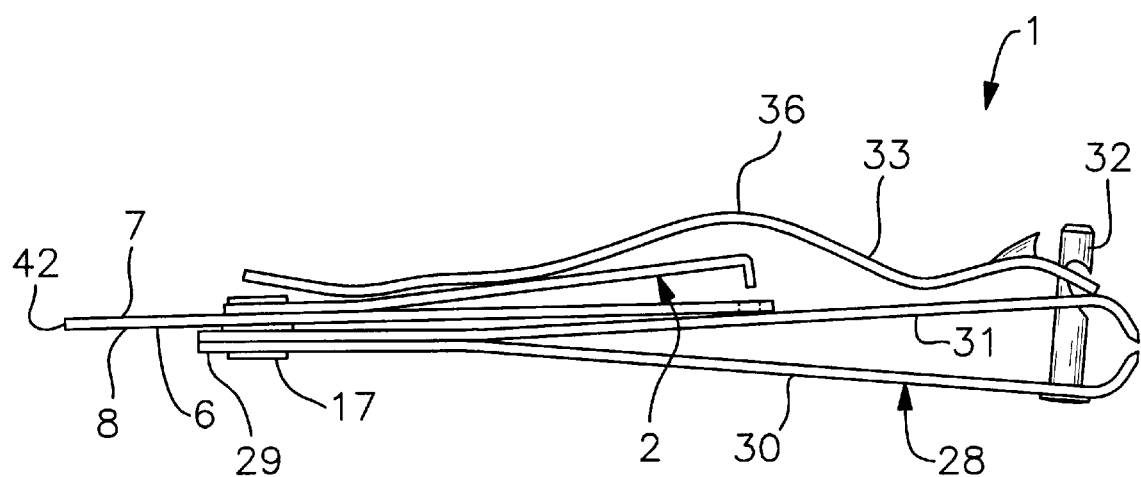
FIG. 1 is a side view showing an embodiment of the invention in closed position.

The drawing shows a hand operated multi-purpose fisherman's tool 1 in accord with this invention, having a component 2 for removing unwanted material 3 from the eyehole 4 of fishing tackle 5, such as a fish hook or fishing lure eye. A flat planar base plate 6 having a predetermined uniform thickness has upper and lower parallel surfaces 7 and 8, each of which occupies a single plane. A rectangular opening 9 passes completely through base plate 6 adjacent its front end 10, with the predetermined longest or maximum dimension of the rectangular opening 9 being transverse to the longitudinal axis 11 of the base plate. An enlarged or widened finger pad surface area 12 is located adjacent to but spaced inwardly from the opening 9.

A material removal arm 13 has a flat planar portion 14 adjacent to and including its rear end 15. The flat planar portion 14 overlies the base plate 6 adjacent its rear end 16, and is fixedly attached to the base plate by a rivet 17 that passes through aligned holes in the arm and base plate.

The arm 13 includes an elongated spring bar 19 made from a resilient metal such as stainless steel. Bar 19 is integral with flat portion 14, but extends upwardly away from flat portion 14 and base plate 6 at an angle 20 of at least about ten degrees. The spring bar 19 is dimensioned and arranged so that its front terminal end 21 is aligned with the opening 9. When the bar 19 and plate 6 are squeezed together, the bar 19 is movable against the resistance of its resiliency from an original position spaced above the plate 6 (shown in FIG. 2) into contact with the plate 6. The resiliency of the bar 19 will return it to its original position when the squeezing force is removed.

Bar 19 has an integral tapered, sharp-pointed triangular prong 22 at end 21. The prong 22 extends at an angle of about ninety degrees to the bar with the wide base of the prong attached to the bar and the point 24 spaced away from the bar and extending toward the base plate 6. The prong 22 is located above the opening 9 and the prong is aligned with the opening. The prong 22 is rectangular in cross section. The wide base of the prong 22 and its longest cross sectional dimension are aligned with the maximum dimension of the opening 9 so that the prong can enter and pass through the opening. The length of the prong is greater than the thickness of base plate 6 so that the point 24 can pass completely through the opening 9 past the lower surface 8.

Spring bar 19 also has a widened finger pad surface area 25 adjacent to but spaced inwardly from the prong 22. The finger pad surface areas 12 and 25 are aligned essentially directly opposite to each other to facilitate the application of hand force or finger pressure for moving the point 24 of prong 22 into opening 9.

Figure 2:
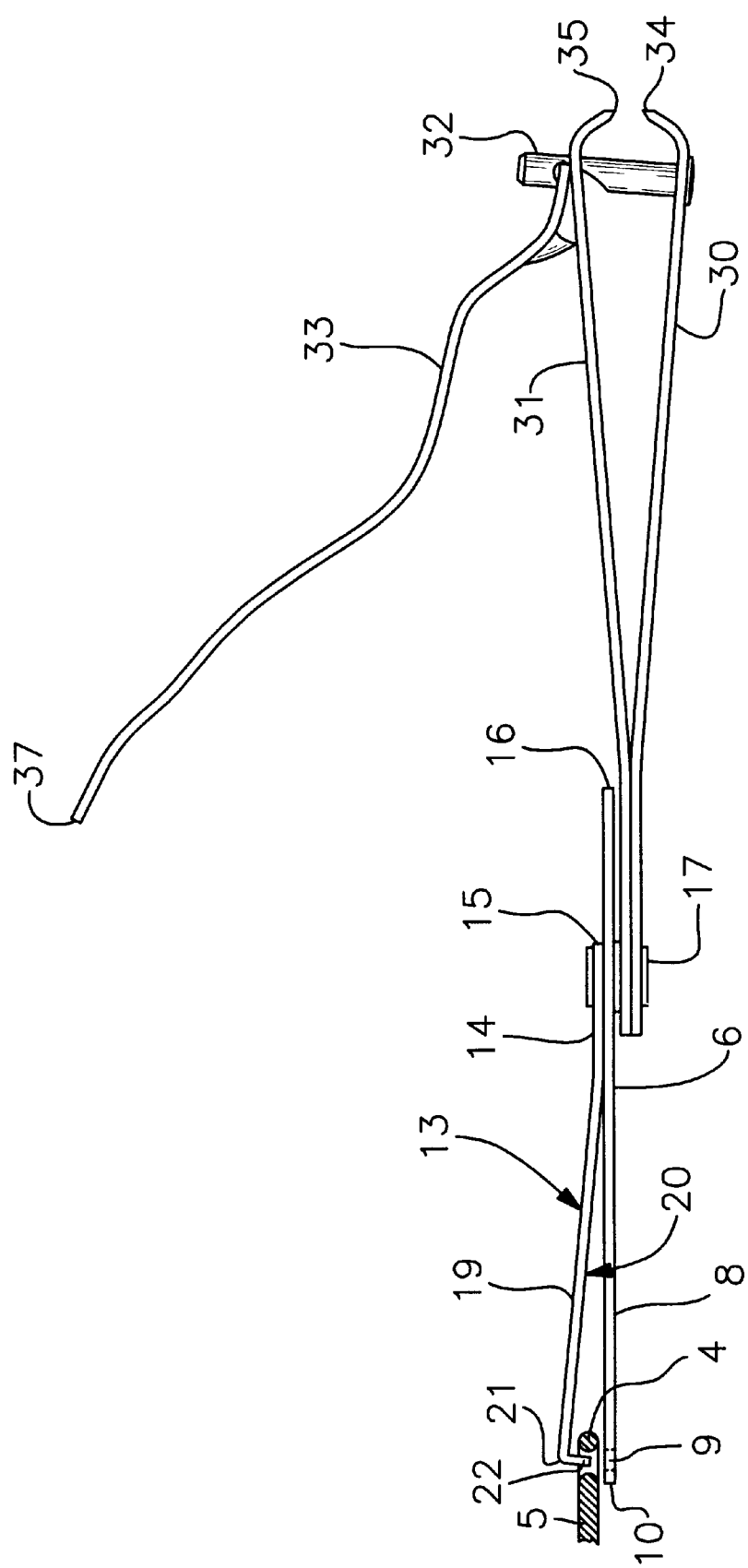
FIG. 2 is a side view showing that embodiment in open position.
Figure 3:
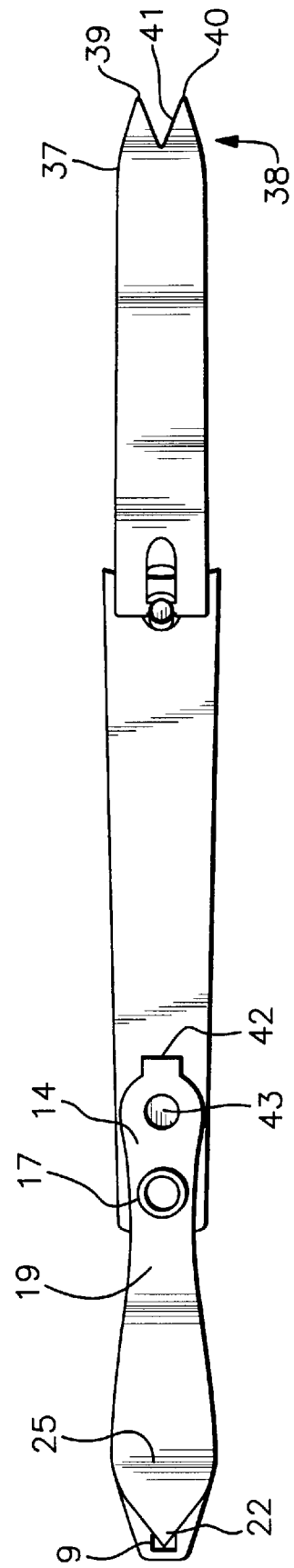
FIG. 3 is a top plan view of that embodiment.
Figure 4:
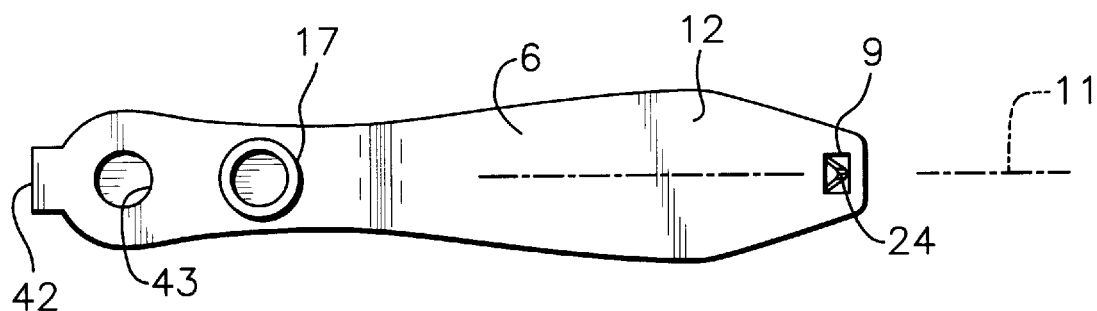
FIG. 4 is a partial bottom view of that embodiment.

Before removing unwanted material 3, the eyehole cleaning tool 8 is rotated around the rivet 17 to an open position such as is shown in FIGS. 2–4. When the unwanted material 3 is being removed from the tackle 5, the eyehole 4 is aligned with and supported on at least two sides of opening 9 by its contact with the upper surface 7 of the base plate 6. Tackle having an eyehole of greater diameter than the maximum width of the opening 9 would be supported on all four sides of the opening. Prong 22 is moved downwardly toward base plate 6 until point 24 has passed through the eyehole and into rectangular opening 9. To completely clean the eyehole 4, the parts of the tool 1 must be dimensioned and arranged so that the tackle 5 is rotatable around the prong 22 through an arc 26 of at least about one hundred and eighty degrees while the prong is inside of the eyehole and the base plate 6. Preferably, the tackle 5 is rotatable through an angle of about two hundred and seventy degrees.

Figure 5:
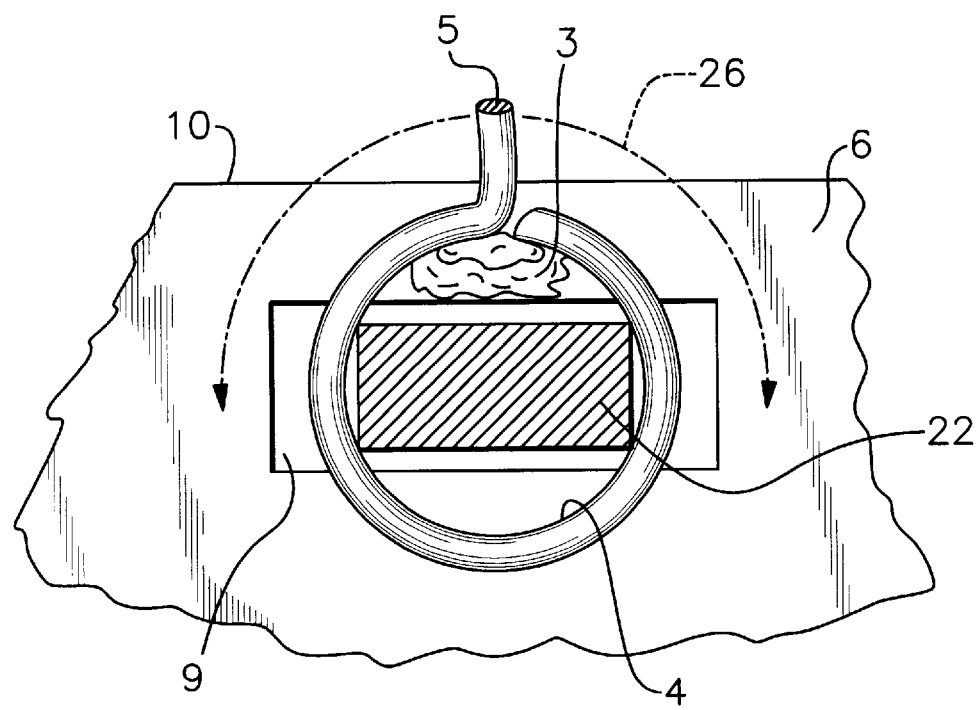
FIG. 5 is an enlarged partial view showing an eyehole being cleaned in the tool shown in FIGS. 1–4.

The plate 6 supports the eyehole 4 so that sufficient force can be applied to the pads 12 and 25 to drive the prong 22 far enough into the eyehole to touch the inside surface of the eyehole, as shown in FIG. 5. This ensures that the eyehole will be quickly and completely cleaned of unwanted material when the tackle is rotated at least one hundred and eighty degrees. The base plate 6 supports the eyehole 4 on all four sides of the opening 9 when the diameter of the eyehole is greater than the maximum dimension of the opening 9. This facilitates cleaning of such a large eyehole because the tackle 5 can be slid back and forth in essentially any direction while it is supported by contact with the base plate upper surface 7. The mating or complementary rectangular cross sections of the prong 22 and the opening 9 tend to secure or support the prong in the opening in a way that prevents the prong from camming out of the opening as the tackle 5 is twisted or rotated when the material is being removed from the eyehole. This protects the user of tool 1 from injury by the contact with the sharp point 24, or the point of a fish hook, that could occur if the prong were to suddenly slip out of the eyehole while the tackle 5 was being manipulated.

The multi-purpose fisherman's tool 1 may have different purpose tools connected to cleaning tool 8. A fishing line or fingernail clipper 28 may be pivotally attached at its rear end 29 to the rear end of tool 8 by the rivet 17. Resilient spring cutters 30 and 31 are moved toward each other along a guide post 32 in conventional manner by a lever or actuator 33. The actuator is pivoted from the closed position shown in FIG. 1 to the intermediate position shown in FIG. 3, and then rotated to the operating position shown in FIG. 2. Movement of the actuator 33 counterclockwise from the position shown in FIG. 2 will force the cutting jaws 34 and 35 to close and clip material placed between them. As shown in FIG. 1, the actuator 33 has a central portion 36 that curves away from the jaws 34 and 35 to enable the cleaning tool 2 to be pivoted between the actuator and the jaws when the tool 1 is in closed position. The free or terminal end 37 of the actuator 33 may include a fish hook disgorger 38 that is defined by a pair of points 39 and 40 that are separated by a V-shaped groove 41. The rear end 16 of the base plate 6 may have a flat straight edge 42 so that the rear end can be used as a screw driver. A hole 43 through base plate 6 may be located between screwdriver edge 42 and rivet 17 so that the tool 1 can be tied to a lanyard or other strand (not shown) for attaching the tool 1 to a convenient location on its user, such as a trouser belt loop.

While the present invention has been described with reference to particular embodiment and methods, it is not intended to illustrate or describe all of the equivalent forms or ramifications thereof. Also, the words used are words of description rather than limitation, and various changes may be made without departing from the spirit or scope of the invention disclosed herein. It is intended that the appended claim cover all such changes as fall within the true spirit and scope of the invention.

I claim:

1. An eyehole cleaning tool for removing unwanted material from the eyehole of fishing tackle, comprising:

A. a base plate having a upper and lower flat parallel surfaces each of which occupies a single plane, said base plate having a predetermined uniform thickness, there being an opening having a predetermined maximum dimension extending completely through said base plate adjacent its front end;

B. a material removal arm having a flat planar portion adjacent to and including its rear end, said flat planar portion overlying said base plate adjacent the rear end of said base plate, said flat planar portion being attached to said base plate adjacent said base plate rear end;

C. said material removal arm having a resilient spring bar integral with said flat planar portion, said spring bar extending upwardly away from said flat planar portion and said base plate at an angle of at least about ten degrees, said spring bar being dimensioned and arranged so that its front terminal end is aligned with said opening in said base plate, said spring bar being movable against the resistance of its resiliency from an original position spaced above said base plate toward said base plate and, into contact with said base plate, the resiliency of said spring bar returning said spring bar to its original position;

D. a tapered, sharp-pointed prong integral with said spring bar and extending at about ninety degrees to said spring bar, said prong being essentially triangular in shape with its base being attached to said front terminal end of said spring bar and its point spaced away from said spring bar and extending toward said base plate, said prong being above and aligned with said opening in said base plate, said base of said prong being smaller than said maximum dimension of said opening in said base plate so that said prong can enter and pass through said opening in said base plate, said prong having a length that exceeds said thickness of said base plate so that its point can pass completely through said opening in said base plate past said lower surface of said base plate; and E. when material is being removed from an eyehole of fishing tackle, said fishing tackle being supported on said upper surface of said base plate with said eyehole aligned with said opening in said base plate, said prong being movable downwardly toward said base plate until said point passes completely through said eyehole into said opening in said base plate, and said eyehole being rotatable around said prong through an arc of about one hundred and eighty degrees while said prong is inside of said eyehole for cleaning said material out of said eyehole.

2. The fishing tackle eyehole cleaning tool defined in claim 1, further comprising said opening in said base plate being rectangular, and the rectangular opening having longest sides as its maximum dimension, said longest sides extending transversely to the base plate longitudinal axis, said prong being rectangular in cross section, and said prong also extending transversely to said base plate longitudinal axis.

3. The fishing tackle eyehole cleaning tool defined in claim 1, further comprising said material removing arm being attached to said base plate by a rivet passing through said flat planar portion and said base plate.

4. The fishing tackle eyehole cleaning tool defined in claim 1, further comprising a different purpose tool pivotally attached to said fish hook eyehole cleaning tool adjacent said rear end of said base plate.

5. The fishing tackle eyehole cleaning tool defined in claim 4, wherein said different purpose tool is a finger nail clipper.

6. The fishing tackle eyehole cleaning tool defined in claim 5, wherein said finger nail clipper comprises a pair of opposed pivotable finger nail cutting jaws and a pivotable actuating lever for forcing said cutting jaws toward each other.

7. The hand operated tool for cleaning material out of a fishing tackle eyehole defined in claim 6, wherein said actuating lever defines a pair of points spaced by a V-shaped groove at one terminal end, and said base plate defines a flat straight edged screwdriver at its rear end.

8. The hand operated tool for cleaning material out of a fishing tackle eyehole defined in claim 6, wherein said actuating lever has a central portion that curves away from said cutting jaws so as to enable said base plate and material removal arm to be pivoted between said cutting jaws and said actuating lever.

9. The fish hook eyehole cleaning tool defined in claim 1, further comprising said base plate having an enlarged surface area adjacent to but spaced rearwardly from said opening, and said bar having a corresponding enlarged surface area adjacent to but spaced inwardly from said prong, said enlarged surface areas being essentially directly opposite to each other for receiving the application of hand force for moving said prong into said opening in said base plate.

10. The fishing tackle eyehole cleaning tool defined in claim 1, wherein said fishing tackle is rotatable around said prong through and angle of up to about two hundred and seventy degrees.

11. A hand operated tool for cleaning material out of a fishing tackle eyehole, comprising:
- A. a flat base plate having upper and lower parallel surfaces each of which occupies a single plane, said base plate having a predetermined uniform thickness, there being a rectangular opening extending completely through said base plate adjacent its front end, said rectangular opening having its longest sides extending transversely to the base plate longitudinal axis, and a widened finger pad surface area on said base plate located adjacent to said rectangular opening but spaced inwardly from said rectangular opening;
- B. a material removal arm having a flat planar portion adjacent to and including its rear end, said flat planar portion overlying said base plate adjacent the rear end of said base plate, said flat planar portion being riveted to said base plate adjacent said base plate rear end;
- C. said material removal arm including an elongated resilient spring bar integral with said flat planar portion, said spring bar extending upwardly away from said flat planar portion and said base plate at an angle of at least about ten degrees, said spring bar being dimensioned and arranged so that its front terminal end is aligned with said opening in said base plate, said spring bar being movable against the resistance of its resiliency from an original position spaced above said base plate toward said base plate and into contact with said base plate, and the resiliency of said spring bar returning said spring bar to its original position;
- D. a tapered, sharp-pointed triangular prong integral with said spring bar and extending at about ninety degrees to said spring bar, said triangular prong being rectangular in cross section and having the longest dimension of its cross section extending transversely to said base plate longitudinal axis, said triangular prong having a base attached to said front end of said spring bar and the point of said triangular prong being spaced away from said spring bar and extending toward said base plate, said triangular prong being above and aligned with said rectangular opening in said base plate, said base of said triangular prong being aligned with said maximum dimension of said rectangular opening in said base plate and being smaller than said maximum dimension of said rectangular opening in said base plate so that said triangular prong can enter and pass through said rectangular opening in said base plate, and said triangular prong having a length that exceeds said thickness of said base plate so that its point can pass completely through said opening in said base plate past said lower surface of said base plate;
- E. said spring bar having a widened finger pad surface area adjacent to but spaced inwardly from said prong, said finger pads on said bar and said base plate being essentially directly opposite to each other to facilitate the application of hand force for moving said triangular prong into said triangular opening; and
- F. when material is being removed from a fishing tackle eyehole, said fishing tackle being supported on said upper surface of said base plate with said eyehole aligned with said rectangular opening in said base plate, said triangular prong being movable downwardly toward said base plate until said point passes completely through said eyehole into said rectangular opening in said base plate, and said fishing tackle being rotatable around said triangular prong through an arc of about one hundred and eighty degrees while said triangular prong is inside of said eyehole and said rectangular opening in said base plate for cleaning said material out of said eyehole.

12. The hand operated tool for cleaning material out of a fishing tackle eyehole defined in claim 11, further comprising a different purpose tool pivotably attached to said hand operated tool by said rivet adjacent said rear end of said base plate.

13. The hand operated tool for cleaning material out of a fishing tackle eyehole defined in claim 12, wherein said different purpose tool is a finger nail clipper comprising a pair of opposed pivotable finger nail cutting jaws and a pivotable actuating lever for forcing said cutting jaws toward each other.

\* \* \* \* \*